United States Patent

[11] 3,574,881

| [72] | Inventor | Reinhold Temple<br>710 Dahlia, Denver, Colo. 80220 |
|---|---|---|
| [21] | Appl. No. | 833,435 |
| [22] | Filed | June 16, 1969 |
| [45] | Patented | Apr. 13, 1971 |

[54] HEATED WINDSHIELD WIPER-SPRAY ASSEMBLY
13 Claims, 6 Drawing Figs.

| [52] | U.S. Cl. | 15/250.04 |
|---|---|---|
| [51] | Int. Cl. | B60s 1/46 |
| [50] | Field of Search | 15/250.01—250.07 |

[56] References Cited
UNITED STATES PATENTS

| 1,738,884 | 12/1929 | Gearhart | 15/250.04 |
| 1,888,326 | 11/1932 | Mullen | 15/250.04 |
| 2,748,416 | 6/1956 | Benoit | 15/250.04 |
| 3,427,675 | 2/1969 | Tibbet | 15/250.04 |
| 3,447,186 | 6/1969 | Senkewich | 15/250.04 |
| 3,448,482 | 6/1969 | Close | 15/250.04 |
| 3,458,888 | 8/1969 | Carpenter | 15/250.04 |

Primary Examiner—Alfred R. Guest
Attorney—John E. Reilly

ABSTRACT: A heated windshield wiper-spray device is suited for cleaning the windshield and removing ice from the wiper blade of a vehicle during subfreezing temperatures and snow and sleet conditions and includes a fluid heating block and a heating element, preferably an electric resistance wire on the wiper blade, to move conjointly with the blade as it wipes back and forth across the windshield. The heating element and block are enclosed in a housing forming a heating chamber on the back of the blade. Spray nozzles in the outlets of the block are arranged to spray heated fluid onto the windshield.

Patented April 13, 1971
3,574,881
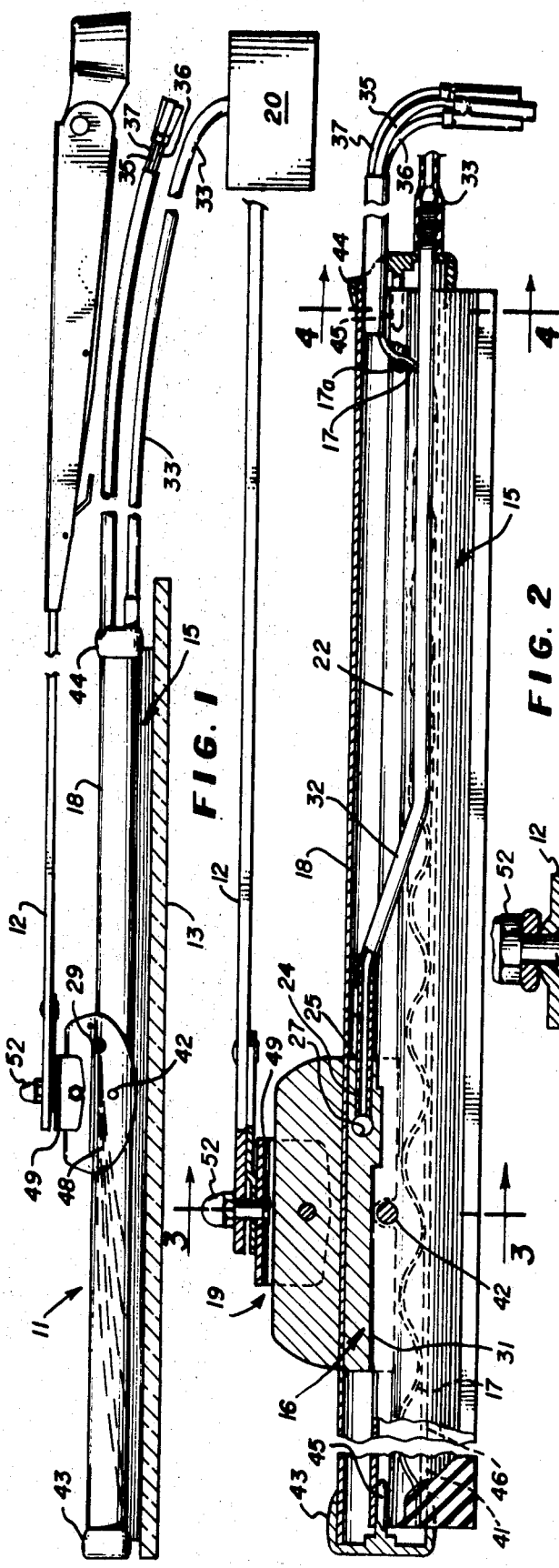
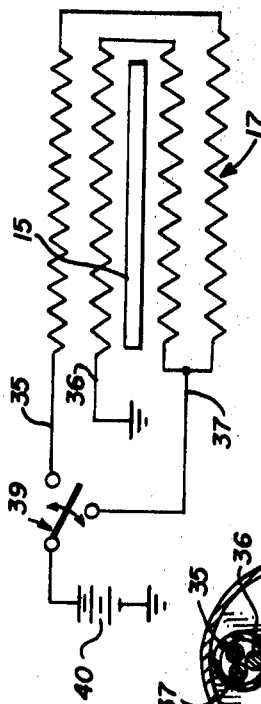
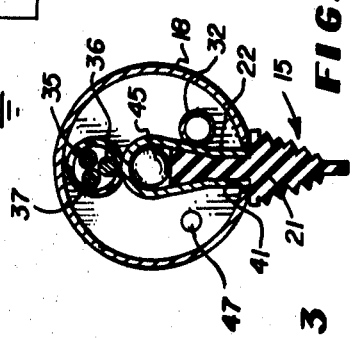
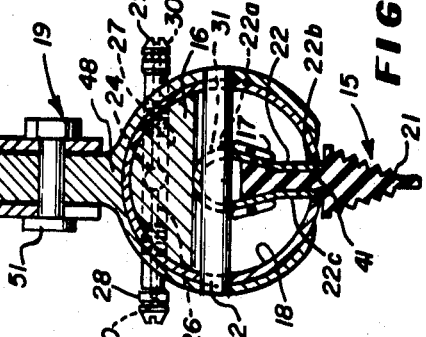
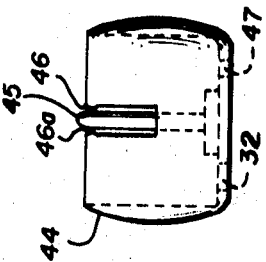
INVENTOR.
Reinhold Temple
BY
John E. Reilly
ATTORNEY

HEATED WINDSHIELD WIPER-SPRAY ASSEMBLY

This invention relates to a heated windshield wiper-spray assembly for cleaning the windshield of a motor vehicle during subfreezing weather and preventing the collection of ice on the windshield and the wiper blade while driving.

The operation of motor vehicles during subfreezing conditions frequently becomes hazardous due to the impairment of vision which may result from the formation of ice on the vehicle windshield or on the wiper blade. There is a tendency for ice to collect or build up on the wiper blade as it is moved back and forth over the windshield and this will materially affect the driver's vision and also the effective wiping action of the blade. Many motor vehicles are now equipped with fluid pressure washer units to spray a fluid onto the windshield to assist in the cleaning action of the wiper blade but this may also tend to freeze up particularly at the exterior outlets.

An attempt was made in the U.S. Pat. No. 1,738,884 to Gearhardt to provide heating and fluid cleaning in an arrangement whereby the fluid was passed through an absorbent wiper swab adapted to wipe over the windshield to assist in removal of ice or snow from the windshield. This swab construction differs materially from a present conventional squeegee portion of a solid rubberized material or rubber composition which is now used as the wiper blade. There is a clear disadvantage from the standpoint of heat transfer in encompassing a heating element in the flexible wiper portion which is not a heat conductive material.

Accordingly, it is an object of this invention to provide a simple, durable and efficiently heated windshield wiper-spray assembly which will prevent the forming of ice deposits on the wiper blade and arm and functions to remove ice and frost from the windshield during subfreezing temperatures.

Another object of this invention is to provide a novel and improved thermally heater wiper and spray combination which does not require a modification of the wiper blade and may be readily attached to the wiper arm of and connected to the conventional windshield washer unit provided with many motor vehicles.

Yet a further object of this invention is to provide an efficiently heated windshield wiper-spray assembly using a controlled electric heating element to heat both the backing member for the blade and a fluid heating block on the blade.

In accordance with the present invention there is provided a heating element for a combined wiper and spray assembly which is adapted to be mounted on the wiper arm and receive fluid under pressure from a windshield washer unit on the motor vehicle. A fluid heating block and heating element, preferably an electric resistance wire, are constructed and arranged on the back of the wiper blade in close proximity to one another and to the wiping edge to provide good heat transfer; and an enclosed tubular housing detachably mounts along the back of the blade encompassing the block and heating element to form a heating chamber. A slot in the housing together with removable end closures facilitates the removal and replacement of wiper blades when worn.

Other objects, advantages and capabilities of the present invention will become more apparent as the description proceeds taken in conjunction with the accompanying drawings, in which:

FIG. 1 is a side elevation view of the heated windshield wiper-spray assembly mounted on the wiper arm of a vehicle to oscillate across the windshield;

FIG. 2 is a fragmentary side elevational view of the assembly shown in FIG. 1 with external portions broken away to show interior construction;

FIG. 3 is a sectional view taken along lines 3—3 of FIG. 2;

FIG. 4 is a sectional view taken along lines 4—4 of FIG. 2;

FIG. 5 is a bottom plan view of one of the end closure caps; and

FIG. 6 is a schematic electric circuit diagram for selectively controlling the power to the heating member.

Referring now to the drawings there is shown in FIG. 1 an assembly 11 embodying features of the present invention mounted for movement with a wiper arm 12 which is typically provided of those as standard equipment on a motor vehicle for movement across the windshield 13 of the vehicle. The assembly 11 is broadly comprised of a blade 15, a fluid heating block 16 positioned centrally of and mounted on the back of the blade, a heating member or element 17 in the form of a resistance wire extending along the back on both sides of the blade together with a closed tubular housing 18 encompassing the element 17 and the block 16 so as to form a heating chamber on the back of the blade 15. The housing 18 is broadly provided with a mount assembly 19 for securing it to the wiper arm and a washer unit 20 comprised of a fluid reservoir and a pump to deliver a fluid to the block 16 in a manner to be described.

The blade 15 comprises a flexible wiper portion or squeegee 21 having a flat wiping edge which engages the windshield and a rigid backing portion or backing member 22. The backing member 22 is formed of a sheet of material preferably having good heat conductive properties such as a metal which is bent across its width over the back of the rubber wiper portion 21 and is coextensive with its length. The backing member 22 is shaped or formed in an essentially keyhole configuration with a circular portion 22a open at each end and parallel side portions 22b and 22c having a width smaller than the diameter of the circular portions.

The heating block 16 is an integral body formed of a good heat conductive material which is provided with a longitudinal, centrally disposed, passage 24 having a water inlet 25 at one end and having lateral outlets 26 and 27 on each side. The outlets 26 and 27 are internally threaded to receive externally threaded, hollow jets or nozzles 28 and 29, respectively, each having a restricted outlet 30 directed to spray the heated fluid and preferably as shown in FIG. 1 toward the top of the windshield. The block 16 is provided with a cross-sectional shape to fit in the housing against the back of the blade and a longitudinal external recess 31 is provided along its underside together with a circular contour oppositely of the recess. In this way the block straddles the blade and thereby functions to hold or stabilize the blade 15 in place in the central part of the housing. A pipe 32, preferably rigid and having good heat conductive properties, extends through one end of the housing into the inlet of the block to deliver fluid thereto. The heat from the element 17 will also heat the pipe 32 and the fluid prior to its entry into the block. As shown, a flexible conduit 33 is mounted at the inlet of pipe 32 externally of the housing to deliver a washing fluid under pressure from a washer unit 20, provided on the vehicle. Unit 20 is furnished with some motor vehicles and may be a hydraulic or an electric pump, a tank and lines suitable for pumping the fluid through the block 16. In the operation then a fluid such as water or alcohol is pumped through the flexible conduit 33, conduit 32, into the block 16 and out the nozzle jets 28 and 29 onto the windshield as the wiper is oscillated back and forth.

The resistance heating wire 17 is secured at one end of the backing member as with a weld or solder connection indicated at 17a and extends along one side across the opposite end and back along one other side in the structure shown in FIGS. 2 and 3. This wire is shaped in a sinuous pattern for better heat distribution. One preferred material for the heating wire is identified in the trade as Nichrome which is presently used in thermal electric toasters and will be covered with an asbestos layer for electric insulation. For additional heating the resistance wire may be a double arrangement whereby the wire doubles back along the sides, across the same end and back along the first-mentioned side of the blade in a manner depicted schematically in FIG. 6. For this double arrangement there is provided three electric lines shown and designated 35, 36 and 37 which extend through one end of the housing with female sockets at the free ends to adapt the assembly for quick connection into the electric wiring harness of the vehicle to receive power from the vehicle battery. As best shown in the schematic diagram of FIG. 6 one of the lines 35 is connected to one terminal end of the resistance wire and the other end is connected to the ground wire 36 with the third wire connected at an intermediate point between the terminal ends of the resistance heating wire. A two-way electric switch 39 is connected between the battery and one end terminal and the intermediate terminal of the wire to selectively apply voltage to either approximately one-half the wire length of the total length of the wire 16 from the battery 40 depending on the heat requirements. The electric switch 39 is located in an accessible location to the driver for easy activation of the heating wire.

To facilitate the removal and replacement of new blades, the housing 18 preferably is of a generally tubular shape and has a longitudinal slot 41 sized to slidably receive and frictionally engage the flat sides 22b and 22c. A pin 42 extends through a transverse hole in the block and its housing to secure the blade in place. Thus the housing encloses the resistance wire and block to form a heating chamber therefor. Removable end caps or closures 43 and 44 are provided at each end of the housing to close the housing once the block and blade have been inserted into position. As best shown in FIG. 5, each end cap has a centrally disposed pin 45 shaped to slide-fit into the open end of the rigid backing member and a slot 46 along its inturned edges which fits over the end of the flat side portions of the backing member to serve also to hold the blade in place at the ends. Opposing end portions 46a are provided in the slot to provide a gripping action. An aperture 47 is provided in the end of cap 44 to allow for drainage from internally of the housing.

The mounting assembly 19 is the form of a centrally disposed upstanding rib section 48 on the tubular body together with a U-shaped adapter bracket 49 which is removably attached to the wiper rib section 48 by a bolt and nut assembly 51. Another nut and bolt assembly 52 connects the top of the adapter to the free end of the wiper arm. It is understood that other mountings are suitable for detachably securing the assembly to the housing.

Although the present invention has been described with a certain degree of particularity, it is understood that the present disclosure has been made only by way of example and that changes in details of structure and system components may be made without departing from the spirit thereof.

I claim:

1. A heated windshield wiper-spray assembly adapted to be mounted on the wiper arm of a motor vehicle, said assembly comprising a wiper blade inclusive of a flexible wiper portion with a wiping edge and a rigid backing portion, a fluid heating block mounted on said backing portion with an internal fluid flow passage arranged to receive a fluid under pressure, heating means for heating said block whereby to heat the fluid passed through said flow passages and fluid outlets communicating with the passage to spray the fluid passing through the passage onto the windshield.

2. A heated windshield wiper-spray assembly as set forth in claim 1 wherein said heating block is disposed externally and centrally of the blade terminating at each end substantially inwardly of the ends of the blade and has an inlet in the passage at one end and fluid outlets at each side of said block.

3. A heated windshield wiper-spray assembly as set forth in claim 1 wherein said heating means includes an electric resistance wire extending along opposite sides of the backing portion of the blade.

4. A heated windshield wiper-spray assembly as set forth in claim 3 which includes a generally tubular housing closed at the ends and enclosing the resistance wire and block to form a closed heating chamber along the back of the wiper blade.

5. A heated windshield wiper-spray assembly as set forth in claim 4 wherein said tubular housing has mounting means centrally of its backing portion arranged for removable attachment of the wiper arm thereby transmitting motion from the housing to the wiper arm of the blade.

6. A heated windshield wiper-spray assembly adapted to be mounted on the wiper arm of a motor vehicle, said assembly comprising a wiping blade inclusive of a flexible wiper portion with a wiping edge and a rigid backing portion, a fluid heating block mounted externally of said blade with an internal fluid flow passage therein arranged to receive a fluid under pressure, electric heating means mounted on said backing for heating said block and blade whereby to heat the fluid passing through said flow passage and fluid outlets communicating with the passage to spray the fluid passing through the passage onto the windshield.

7. A heated windshield wiper-spray assembly adapted to be mounted on the wiper arm of a motor vehicle, said assembly comprising a blade inclusive of a flexible wiper portion with a wiping edge and a rigid backing portion, a fluid heating block, mounted on the backing portion including an internal fluid flow passage arranged to receive a fluid delivered under pressure, to heat the fluid and having means in the outlet of the passage including jet portions to direct the fluid onto the windshield as a spray, a heating member supported on the blade including an electric resistance wire mounted on the backing portion, and a removable tubular body with detachable end closure caps, said body encompassing the resistance wire and block.

8. A heated windshield wiper-spray assembly as set forth in claim 7 wherein said tubular body has a longitudinal slot arranged to slide over the narrowed sides of the blade.

9. A heated windshield wiper-spray assembly as set forth in claim 7 wherein said end caps are generally hollow and include a pin-shaped member adapted to extend into the end of the blade and a slot adapted to slidably receive the side portions of the blade at each end thereof.

10. A heated windshield wiper-srpray assembly as set forth in claim 7 wherein said heating block is shaped complementary to a portion of the contour of the backing portion and the inner wall of the tubular body so as to fit in frictional engagement therebetween and stabilize the central portion of the blade within the tubular body during the back and forth movement thereof.

11. A heated windshield wiper-spray assembly as set forth in claim 7 including a heat conductive pipe internally of the housing in proximity to the heating member to deliver fluid from internally of the housing into the inlet of the block and transmit heat to the fluid passing therethrough.

12. In a heated windshield wiper-spray assembly for a motor vehicle having wiper arms and a windshield, the combination of a blade member including a flexible squeegee portion and a rigid, heat conductive backing member for the squeegee portion, a heat conductive fluid block seated on the central portion of said backing member having an internal fluid flow passage with an inlet at one end and at least one outlet on each side distant from the inlet, a jet removably mounted in flow communication in each outlet in the block, means for delivering a fluid under pressure to the inlet of the block, an electric resistance wire extending along the sides of the backing member and a generally tubular housing encompassing the wire and block to form a heating chamber and holding the block against the blade to stabilize the blade during movement, said tubular body having a longitudinal slot and removable end caps to permit the blade to be removably inserted in the slot of the body and be closed at the ends, an electric power source on the vehicle and control means for selectively regulating the power from the battery to the resistance wire.

13. In a heated windshield wiper-spray assembly as set forth in claim 12 wherein said control is a two-way switch arranged to connect the battery to selected portions of the resistance wire.